UNITED STATES PATENT OFFICE.

LE ROY BAKER, OF ST. LOUIS, MISSOURI.

PAINT PIGMENT.

1,413,565. Specification of Letters Patent. Patented Apr. 25, 1922.

No Drawing. Application filed July 28, 1919, Serial No. 313,843. Renewed February 27, 1922. Serial No. 539,753.

*To all whom it may concern:*

Be it known that I, LE ROY BAKER, a citizen of the United States, and resident of the city of St. Louis and State of Missouri, have invented certain new and useful Improvements in Paint Pigments, of which the following is a specification containing a full, clear, and exact description thereof.

My invention relates to new and useful paint pigments for use in the manufacture of paints, and the primary object is the production of a sun-proof zinc white pigment, the particles of which are of micro-crystalline formation, the pigment being precipitated in such a way that the particles are of uniform size and density.

My composition consists of zinc sulphide, zinc oxide, and barium sulphate. The particles of the mass or pigment being of angular and crystalline formation and of uniform size and density.

In preparing my composition I prefer to use about 28% of zinc sulphide, about 2% of zinc oxide, and about 70% of barium sulphate. When the pigment has been prepared it is ready for use in the manufacture of paints and is ground in oil in the usual manner.

In preparing my composition of matter I may follow the process described in my application filed July 16, 1919, Serial No. 311,296; that is, I take a solution of zinc sulphate and heat it with steam and subject it to air under pressure and while the zinc sulphate is being thus treated I add to said solution a metallic peroxide of about one per cent by weight of the zinc present, such as calcium or barium, in powdered form, and also add a monoxide, such as zinc oxide or lead oxide of about one per cent, in powdered form. The solution thus treated is transferred through a filter press into another tank wherein it is subjected to the same treatment, and I then transfer the last mentioned solution to another filter press and from the last mentioned filter press the solution is transferred to a storage tank. During both operations of filter pressing the zinc oxide which has passed into the hydrated form passes through the filter press cloths with the liquor as a fine silky precipitate. I then mix this solution with a solution of barium sulphide. I then transfer this solution to another filter press, then I wash the precipitated pigment, dry the same, and calcine it. It is then ground wet, again washed, filter pressed, then dried and packed for market.

It will be noted that the peroxide is added only in sufficient quantities to precipitate the impurities in the zinc sulphate liquor, and the monoxide is added at any stage of the process in sufficient quantities to insure the zinc sulphate liquor being in a basic condition at the time of precipitation. Zinc oxide when added to a zinc sulphate solution passes into the hydrated form in such a state of extreme divisibility that it passes through filter papers and filter cloths, and will not be entirely removed by the filtering process referred to. It will further be noted that my composition is derived by precipitation from basic solutions which gives to the composition the properties set forth and claimed for it.

The pigment that I produce by this process is precipitated in particles of uniform size and density and as previously stated is of micro-crystalline formation, and under the microscope the particles are angular.

I found out that by the use in the manufacture of paints of my composition of matter wherein the particles are of uniform sizes they remain in suspension better, the paint is sun-proof, and the pigments have a greater staining power and produce clearer tints in dark pigments.

I have also found out that by the use of my pigment wherein the particles are of uniform size and density and of micro-crystalline formation the paint film has a greater tensile strength.

Having fully described my invention what I claim is:

1. The herein described composition of matter for the use in the manufacture of paints, consisting of zinc sulphide, zinc oxide and barium sulphate, precipitated from a basic solution of zinc sulphate, whereby the particles thereof are of uniform size and density.

2. The herein described composition of matter for use in the manufacture of paints, consisting of about twenty eight percent zinc sulphide, two per cent zinc oxide and seventy per cent barium sulphate, precipitated from basic solutions, whereby the precipitated particles thereof are of uniform size and density.

3. The herein described composition of matter for use in the manufacture of paints, consisting of a mass whose particles are of uniform size and density, of micro-crystalline formation and consisting of zinc sulphide, zinc oxide, and barium sulphate.

4. The herein described composition of matter for use in the manufacture of paints consisting of a mass whose particles are filter pressed and precipitated from a basic solution, whereby they are all of uniform size and density, of angular form and consist of twenty eight per cent zinc sulphide, two per cent zinc oxide and seventy per cent barium sulphate.

5. A composition of matter for use in the manufacture of paints, consisting of a mass of homogeneous particles precipitated from a basic solution of zinc sulphate and composed of zinc sulphide in the proportion of about 28%, zinc oxide about 2%, and barium sulphate about 70%.

In testimony whereof, I have signed my name to this specification, in the presence of two subscribing witnesses:

LE ROY BAKER.

Witnesses.
JEAN GOLDBERG,
WALTER C. STEIN.